United States Patent
Müller et al.

(10) Patent No.: US 7,267,867 B2
(45) Date of Patent: Sep. 11, 2007

(54) INSULATION MATERIAL BASED ON POLYMERIC PLASTIC

(75) Inventors: Friedrich Müller, Lauf (DE); Christoph Dinkelmeyer, Lauf (DE); Alfred Gemmel, Kalchreuth (DE)

(73) Assignee: Nexans (FR)

( * ) Notice: Subject to any disclaimer, the term of this patent is extended or adjusted under 35 U.S.C. 154(b) by 138 days.

(21) Appl. No.: 10/920,724

(22) Filed: Aug. 18, 2004

(65) Prior Publication Data

US 2005/0074594 A1   Apr. 7, 2005

(30) Foreign Application Priority Data

Oct. 2, 2003   (DE)   ............... 103 45 955

(51) Int. Cl.
*A01K 1/015*   (2006.01)
*H01B 3/30*   (2006.01)

(52) U.S. Cl. .............. 428/221; 174/110 R; 174/111

(58) Field of Classification Search ............ 428/266, 428/220, 299.7, 297.4; 442/79, 409, 361, 442/362, 364, 415, 221, 292.1; 174/110 R, 174/111

See application file for complete search history.

(56) References Cited

U.S. PATENT DOCUMENTS

| | | | |
|---|---|---|---|
| 2,092,647 A * | 9/1937 | Hobart | 174/71 C |
| 2,097,275 A * | 10/1937 | Fischer | 313/493 |
| 3,230,184 A * | 1/1966 | Alford | 523/219 |
| 3,316,139 A * | 4/1967 | Alford et al. | 442/249 |
| 3,630,764 A * | 12/1971 | Shannon | 106/18.11 |
| 4,107,569 A * | 8/1978 | Ronde | 313/402 |
| 4,235,836 A * | 11/1980 | Wassell et al. | 264/333 |
| 4,286,013 A * | 8/1981 | Daroga et al. | 442/136 |
| 4,623,390 A * | 11/1986 | Delmonico | 106/15.05 |
| 5,192,834 A * | 3/1993 | Yamanishi et al. | 174/120 SR |
| 5,672,640 A * | 9/1997 | Brauer | 523/173 |
| 6,372,344 B1 * | 4/2002 | Castellani et al. | 428/379 |
| 6,383,623 B1 * | 5/2002 | Erb, Jr. | 428/299.7 |
| 6,720,072 B1 * | 4/2004 | Hinterwaldner et al. | 428/403 |
| 6,894,227 B2 * | 5/2005 | Kanamori et al. | 174/110 R |

FOREIGN PATENT DOCUMENTS

| | | | |
|---|---|---|---|
| DE | 3336089 | 4/1985 | |
| DE | 3853957 | 2/1987 | 26/10 |
| DE | 9216599 | 4/1993 | 7/28 |
| DE | 69605606 | 6/1995 | |
| DE | 19717645 | 10/1998 | |
| DE | 10022261 | 11/2001 | 83/4 |
| EP | 0373757 | 6/1990 | 7/34 |

\* cited by examiner

*Primary Examiner*—N. Edwards
(74) *Attorney, Agent, or Firm*—Sofer & Haroun, LLP

(57) ABSTRACT

An insulation material based on polymeric plastic is specified, to which glass particles that consist of types of glass with different softening points are added for stabilization in case of fire. To provide protection in a very broad temperature range, at least three types of glass with different softening points are used as the glass particles, namely, a first type of glass with a softening point below about 470° C., a second type of glass with a softening point above about 470° C. and below about 620° C., and a third type of glass with a softening point above about 760° C.

10 Claims, No Drawings

INSULATION MATERIAL BASED ON POLYMERIC PLASTIC

RELATED APPLICATION

This application is related to and claims the benefit of priority to German Patent Application No. 103 45 955.3, filed on Oct. 2, 2003, the entirety of which is incorporated herein by reference.

FIELD OF THE INVENTION

The invention concerns an insulation material based on polymeric plastic, to which glass particles, which consist of types of glass with different softening points, are added for stabilization in case of fire (EP 0 978 128 B1).

BACKGROUND

An insulation material of this type is needed, for example, for the sheath of electrical and optical lines and cables or for the insulation of the cores themselves. Lines of this type include, for example, power lines or communications or data-transmission lines. The special insulation material is intended to ensure proper functioning of such a line in case of fire for a certain period of time. Machines, equipment, and apparatus must continue to be supplied with current during this period of time, and it should be possible to continue transmitting data during this time. The period of time should be sufficiently long, for example, to allow all persons present in a building to be informed and to keep the lights in the building turned on until the persons have left the building and possibly have also brought materials to safety. This period of time, which can be predetermined by the installer of lines of this type is, for example, between 30 minutes and 3 hours.

In the previously known line described in EP 0 106 708 B1, an insulation material is used that consists of mica wrap, a layer of polytetrafluoroethylene (PTFE), and a glass-fiber fabric coated with PTFE. The PTFE is resistant up to about 600° C. At higher temperatures, it disintegrates into ash. A line insulated in this way has an unacceptably high fire load in many cases. Due to the fluorine, it develops toxic and chemically aggressive gases (smoke) in a fire. These gases can attack and destroy metals and electrical and electronic circuits.

EP 0 968 502 A1 describes an insulation material for cables and lines that consists of a polymeric plastic as a first component, glass or ceramizable or crystalline material as a second component, and, for example, aluminum oxide as a third component. The second component is said to begin to melt at a temperature above the melting point of the first component, while the third component is said to melt at temperatures on the order of 1,000° C. This insulation material is supposed to maintain proper functioning of cables and lines in a temperature range of 450° C. to 1,210° C. The aforementioned, very different additives are added to the insulation material at relatively high expense, and for the most part they still require a transformation for a closed layer to be formed.

The previously cited document EP 0 978 128 B1 describes a fire-resistant insulation material for maintaining the function of electrical cables, in which glass frit from low-alkali glasses and passivation glass are added to an organosilicon polymer. Thus, only glass is added to the polymer for stabilization. According to this document, the low-alkali glasses have a melting point below 750° C., while the passivation glass has a melting point of not more than 710° C. In this insulation material, a glass layer that guarantees proper function is formed in the area of 700° C. The function can thus be maintained for a large temperature range starting at about 400° C. only for insulation materials based on organosilicon polymers which themselves start to melt only at relatively high temperatures to form a layer of glass.

OBJECT AND SUMMARY

The objective of the invention is to improve the insulation material described at the beginning in such a way that the proper functioning of lines, cables, and cores insulated with it is ensured in a much larger range of temperatures with little expense.

In accordance with the invention, this objective is achieved by using at least three types of glass with different softening points as the glass particles, namely, a first type of glass with a softening point below about 470° C., a second type of glass with a softening point above about 470° C. and below about 620° C., and a third type of glass with a softening point above about 760° C.

Exclusively glass is added to this insulation material for stabilization in case of fire. Production expense is thus low. Glass has the advantage that it is immediately available as such. Transformation processes in case of fire, such as ceramization, are thus not necessary. The three or more types of glass ensure preservation of function of lines, cables, and cores enclosed by an insulation material of this type over a wide range of temperatures. This protection starts at a temperature of about 400° C., up to which ordinary polymers are stable, and is maintained continuously from this temperature up to 800° C. or higher. The three or more different types of glass with different softening points produce an insulating glass layer that surrounds the line, cable, or core initially at a temperature of less than 470° C. and is stabilized by the glass particles of the other two types of glass that it contains. This stable layer of glass is maintained during the rise in temperature that occurs in a fire until the second type of glass starts to melt. At very high temperatures of 800° C. and higher, the layer of glass formed as a layer of insulation by the third type of glass is maintained at least for the amount of time necessary and prescribed for the preservation of function.

In advantageous refinements of the invention, particles of other types of glass can be additionally added to the insulation material, which more densely cover the transition ranges and continue to provide the desired functional protection even at temperatures well above 800° C.

DETAILED DESCRIPTION

Embodiments of the insulation material of the invention are explained below.

Basically all known polymeric plastics, which are preferably adjusted to be fire-resistant and halogen-free, can be used as the base material. Examples include polyethylene, copolymers of polyethylene, polyesters, polypropylene, silicones, or ethylene-vinyl acetate copolymer.

Glass particles, e.g., in the form of solid spheres or hemispheres, are added to the insulation material in suitable amounts. They can have diameters of 1 μm to 70 μm, or of 1 μm to 20 μm in a preferred embodiment.

At least three different types of glass with different softening points are used to maintain function. For example, 20-120 parts of each of the types of glass are added to 100 parts of a base polymer. In a preferred embodiment, 20-50 parts of each of the types of glass are added to 100 parts of the base polymer. The insulation material, which is also referred to as a compound, can be produced with conventional compounding machines, such as kneaders, twin-screw extruders, or co-kneaders.

Lead glass with a softening point of 461° C., i.e., below 470° C., can be used as the first type of glass. This glass contains less than 10% SiO2, 11% each $B_2O_3$ and $Al_2O_3$, and 75% PbO.

An iron-fusible glass with a softening point of 614° C., i.e., between 470° C. and 620° C., can be used as the second type of glass. This glass consists of 58% $SiO_2$, 20% $NaO_2$, and less than 10% each of $Al_2O_3$, $K_2O$, CaO, ZnO, BaO, and F.

A tungsten-fusible glass with a softening point above 760° C. is used as the third type of glass. Its softening point is 765° C. It contains 75% $SiO_2$, 16.5% $B_2O_3$, and 10% each of $Al_2O_3$, $Na_2O$, and $K_2O$.

Fillers, such as aluminum hydroxide, magnesium hydroxide, chalk, or silicates, preferably phyllosilicates, such as bentonite or illites, can be added to the insulation material. For example, 5-80 parts of such fillers are additionally added per 100 parts of base polymer.

Cases of property damage in the recent past show that retention of function, especially at very high temperatures, is very important. Therefore, it is advantageous to add additional glass particles with very high softening points.

An example of a fourth type of glass with a softening point above 780° C. is apparatus glass G20, a borosilicate glass. Its softening point is 790° C. It consists of 78% $SiO_2$, 10% $B_2O_3$, and less than 10% each of $Al_2O_3$, $Na_2O$, CaO, and BaO.

Duran, an alkali borosilicate glass that can be used as a fifth type of glass, has an even higher softening point of 815° C. This glass consists of 80% $SiO_2$, 13% $B_2O_3$, and less than 10% each of $Al_2O_3$, $Na_2O$, and $K_2O$.

The invention claimed is:

1. An insulation material, wherein said insulation material is based on: a polymeric plastic, to which glass particles that consist of types of glass with different softening points are added for stabilization in case of fire, wherein at least three types of glass with different softening points are used as the glass particles, namely, a first type of glass with a softening point below about 470° C., a second type of glass with a softening point above about 470° C. and below about 620° C., and a third type of glass with a softening point above about 760° C.

2. The insulation material in accordance with claim 1, wherein the first type of glass is lead glass with a softening point of 461° C.

3. The insulation material in accordance with claim 1, wherein the second type of glass is an iron-fusible glass with a softening point of 614° C.

4. The insulation material in accordance with claim 1, wherein the first type of glass is a tungsten-fusible glass with a softening point above 765° C.

5. The insulation material in accordance with claim 1, wherein particles of a fourth type of glass with a softening point above 780° C. are used.

6. The insulation material in accordance with claim 1, wherein particles of a fifth type of glass with a softening point above 800° C. are used.

7. The insulation material in accordance with claim 1, wherein the glass particles are shaped as solid spheres and/or hemispheres.

8. The insulation material in accordance with claim 1, wherein the diameter of the glass particles is 1 pm to 70 pm, and preferably 1 pm to 20 pm.

9. The insulation material in accordance with claim 1, wherein the polymeric plastic is halogen-free.

10. The insulation material in accordance with claim 1, wherein the polymeric plastic is fire-resistant.

* * * * *